May 8, 1951  E. E. HOOD  2,552,484
HUB BRAKE
Filed Oct. 30, 1947  2 Sheets-Sheet 1
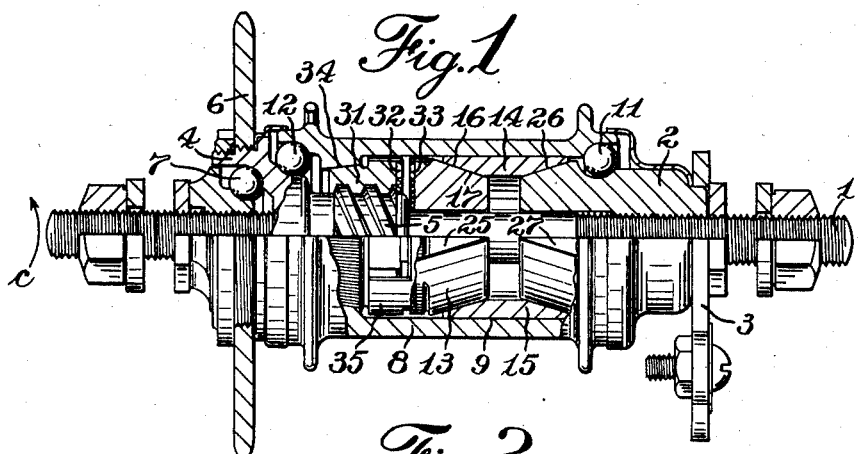
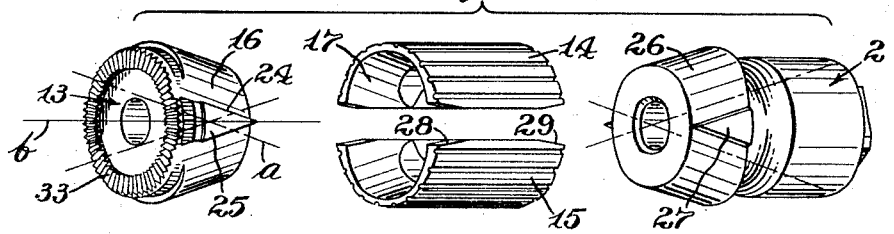
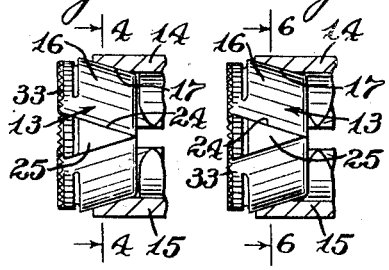 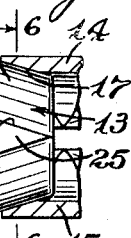
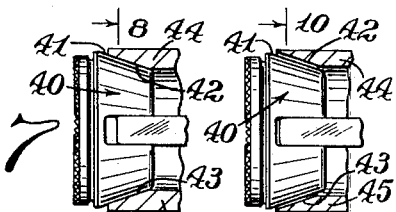
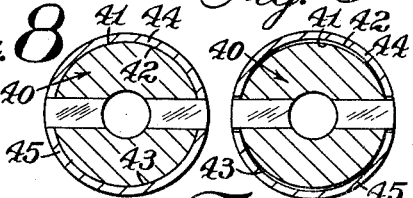
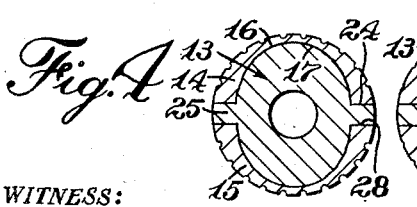 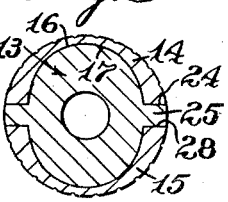
INVENTOR.
E. Elliott Hood
BY
Clinton S. Janes
ATTORNEY
WITNESS:
Esther M. Stockton May 8, 1951  E. E. HOOD  2,552,484
HUB BRAKE
Filed Oct. 30, 1947  2 Sheets-Sheet 2
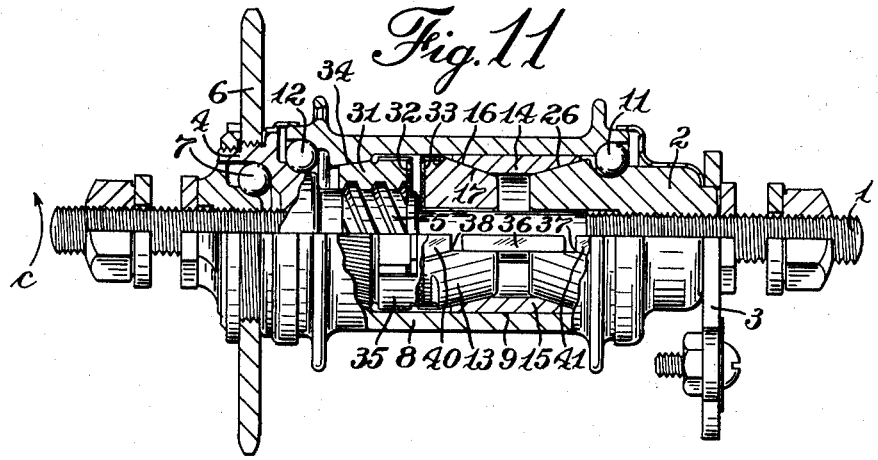
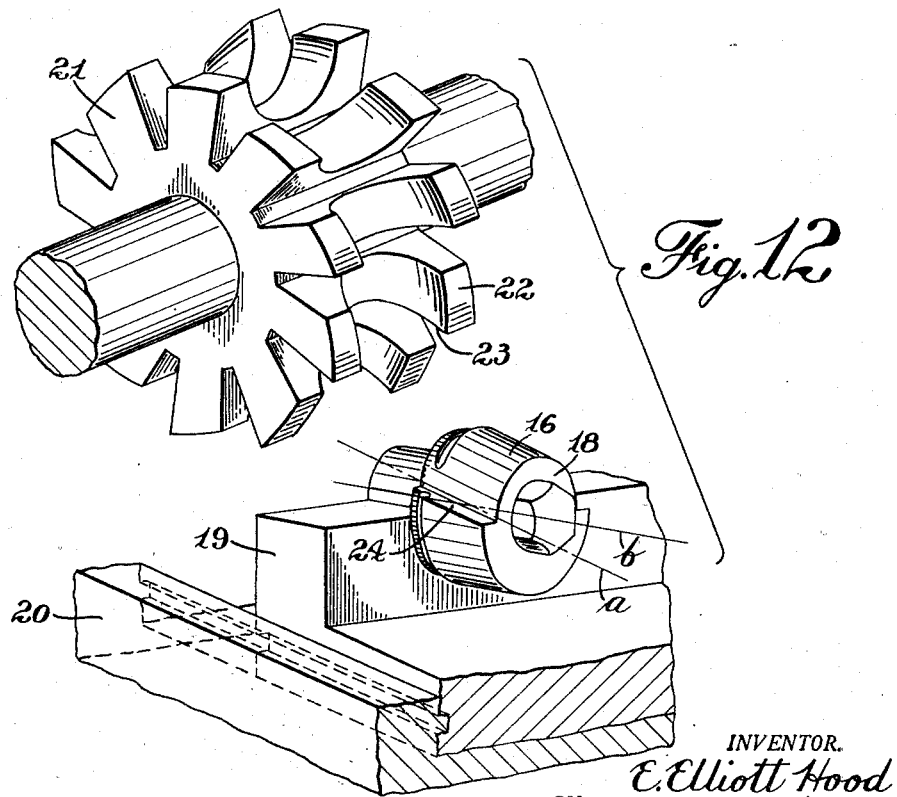
INVENTOR.
E. Elliott Hood
BY
Clinton S. James
ATTORNEY
WITNESS:
Esther M. Stockton Patented May 8, 1951

2,552,484

UNITED STATES PATENT OFFICE 2,552,484

HUB BRAKE

E. Elliott Hood, Elmira, N. Y., assignor to Bendix Aviation Corporation, Elmira Heights, N. Y., a corporation of Delaware Application October 30, 1947, Serial No. 782,973

3 Claims. (Cl. 188—26)

1

The present invention relates to a hub brake for velocipedes and more particularly to an improved brake of the expanding sleeve type.

The present invention is an improvement of the structure disclosed in applicant's prior Patent 2,410,785 issued November 5, 1946, in respect to the means for controlling the application of the brakes.

It is an object of the present invention to provide a novel coaster brake of the expanding sleeve type having improved means for expanding the brake elements.

It is another object to provide such a device in which the expanding means is so designed that its initial efficiency of operation is maintained irrespective of wear of the braking elements.

It is another object to provide such a device in which the elements of the expanding means are so formed as to have surface contact with each other, and to maintain said surface contact irrespective of wear caused by operation of the brake.

Further objects and advantages will be apparent from the following description taken in connection with the accompanying drawing in which:

Fig. 1 is a side elevation partly broken away and in section of a preferred embodiment of the invention;

Fig. 2 is a detail in perspective of the brake sleeve and expanding elements therefor shown in disassembled relation;

Fig. 3 is a detail partly in side elevation and partly in section showing the relationship of the brake sleeve members and the expanding member when the brake is new;

Fig. 4 is a section taken substantially on the line 4—4 of Fig. 3;

Fig. 5 is a view similar to Fig. 3 showing the position of the parts after substantial wear of the brake sleeve has taken place;

Fig. 6 is a section taken substantially on the line 6—6 of Fig. 5;

Figs. 7 to 10 are views similar to Figs. 3 to 6 showing the result of wear on the brake elements when the expanding element is formed with conventional conical surfaces;

Fig. 11 is a view similar to Fig. 1 of an embodiment of the invention in which separate anchoring means for the expander and brake sleeve are incorporated; and Fig. 12 is a perspective view of the blank for the expander member with the milling cutter therefor, showing the method of forming the camming surfaces of the expander.

In Fig. 1 of the drawing there is illustrated a hub type of coaster brake including a fixed axle 1 on which is threaded an anchor member 2 which is prevented from rotation by arm 3 fixed in any suitable manner to the frame of the vehicle not illustrated. A driving and control member 4 comprising a threaded portion 5 and a sprocket 6 is journalled on the axes 1 by means of bearings 7; and a wheel hub 8 having a cylindrical braking surface 9 is journalled on the anchor member 2 and the driving member 4 by means of bearings 11, 12 respectively.

An expander member 13 is slidably mounted on the axle 1 in position to engage and actuate a brake sleeve comprising elements 14, 15 which are slidably mounted on the expander member 13 and anchor member 2 and are provided with exterior cylindrical surfaces conforming to the inner brake surface 9 of the hub 8.

The cooperating surfaces of the expander and anchor members and the brake elements are inclined to the axis of the hub so that movement of the expander member toward the anchor member will cam the brake sleeve elements out against the interior of the hub 8. As best shown in Fig. 2, these inclined surfaces are so formed as to maintain full surface contact thereof irrespective of longitudinal displacement caused by wear of the brake elements. This is accomplished by forming these surfaces of cylindrical contour with their axes inclined to the axis of the hub. Thus the camming surface 16 of the expander member 13 is substantially semi-cylindrical in form with its axis $a$ inclined to the axis $b$ of the expander. The corresponding interior surface 17 of the brake element 14 is similarly formed so that surface contact is maintained at all times as indicated in Figs. 3 to 6 inclusive.

These inclined surfaces are preferably formed in the manner indicated in Fig. 12 in which a blank 18 is shown maintained on a slide 19 in a suitable milling machine, the blank being so positioned on the slide 19 that its axis $b$ is inclined to the path of movement of the slide 19 in the guides 20 at an angle equal to the angle between axes $a$ and $b$ in Fig. 2. A milling cutter 21 is arranged in the path of movement of the blank 18 and is provided with teeth 22 having semi-circular cutting edges 23 whereby the cylindrical surface 16 of the expander member is formed thereon by the action of the cutter on the blank.

It will be noted that the action of the cutter on the blank leaves a laterally extending surface 24 on the blank, whereby the finished expander member has triangular projections 25 (Fig. 2), the surfaces of which are substantially co-planar with the axes of the corresponding inclined cylindrical surfaces. The anchor member 2 is similarly formed with inclined cylindrical surfaces 26 and triangular projections 27, and the brake elements 14, 15 are provided with inclined surfaces 28, 29 conforming to the surfaces of said triangular projections. The engagement of the inclined surfaces 28, 29 with said projections prevent rotation of the expander member 13 and transmit the braking torque from the brake elements 14, 15 to the anchor member 2.

Means for moving the expander member 13 longitudinally to apply the brake is provided in the form of a nut 31 threaded on the screw threaded portion 5 of the driving member 4 and provided with teeth 32 arranged to engage corresponding teeth 33 in the adjacent surface of the expander member. The nut 31 is provided with a clutch surface 34 arranged to engage a corresponding surface in the interior of the hub 8 to transmit forward rotation thereto. Traversal of the nut 31 from driving to braking positions is insured by means of a retarding element 35 anchored to the expander member 13 and bearing frictionally on the nut 31.

In some instances it may be deemed preferable to spline the expander member directly to the anchor member, and this may be accomplished as illustrated in Fig. 11 which shows rectangular keys 36 slidably mounted in mating recesses 37, 38 in the anchor and expander members respectively, the keys 36 also serving as abutments for the brake sleeve elements 14, 15. In this case the triangular projections 25 and 27 are preferably milled off to prevent interference, leaving flat surfaces as shown at 40 and 41. The remaining structure in Fig. 11 is the same as illustrated in Fig. 1, the parts being similarly numbered.

In operation, the parts being initially in the positions illustrated in Fig. 1, backward rotation of the sprocket 6 in the direction of the arrow c causes the nut 31 to traverse to the right, engaging the expander member 13 which positively prevents rotation of the nut 31 by means of the clutch engagement 32, 33. Backward pressure on the sprocket 6 thereafter causes the nut 31 to press the expander member to the right, causing the brake elements 14, 15 to be expanded into engagement with the interior of the hub while being prevented from rotation by the connection to the anchor member 2, either by means of the triangular projections 25, 27 or the keys 36. Due to the cylindrical form of the inclined surfaces of the expander and anchor members and the brake elements, these surfaces slide on each other while maintaining full surface contact, and such cooperation is maintained throughout the life of the brake elements 14, 15 whereby smooth and uniform action of the brake is secured.

The difference of the present structure from the conventional conically formed expanding members insofar as the effects of wear are concerned may be perceived by comparison of Figs. 3 to 6 with Figs. 7 to 10. In Figs. 7 to 10 the expander 40 is formed with a conical surface 41 engaging similar surfaces 42, 43 in the ends of the brake shoes 44, 45. They accordingly have surface contact at one relative position as shown in Figs. 7 and 8 and by proper design this may be caused to occur substantially at the time the brake shoes engage the interior of the wheel hub. As the exterior of the brake shoes wear away, however, it becomes necessary for the expander 40 to enter further into the brake shoes to expand them sufficiently to engage the interior of the hub, whereupon the condition shown in Figs. 9 and 10 obtains. As there shown, the movement of the expander into the brake shoes causes portions of the expander of larger diameter to engage the shoes, whereby the engagement takes place only at the edges of the shoes, thus tending to cause springing of the shoes and uneven braking pressure against the interior of the hub.

Although certain dimensions and angular relationships of parts have been illustrated, it will be understood that changes may be made in the precise forms of the parts illustrated without departing from the spirit of the invention.

I claim:

1. In a hub brake for velocipedes a fixed axle, an anchor member mounted thereon, a brake-actuating member journalled on the axle, a wheel hub journalled on the brake-actuating and anchor members having a cylindrical inner braking surface, an expander member slidably mounted on the axle adjacent the anchor member, a brake member having an exterior cylindrical surface conforming to the interior surface of the hub, slidably mounted on the anchor and expander members, the engaging surfaces of the brake member and the anchor and expander members being cylindrical with the axes thereof co-planar and inclined to the axis of the shaft, and means responsive to rotation of the brake-actuating member for moving the expander member toward the anchor member to thereby force the brake member into frictional engagement with the hub.

2. A hub brake as set forth in claim 1 including further, means for splining the brake member and expander member to the anchor member.

3. A hub brake as set forth in claim 1 in which the expander and anchor members are provided with laterally extending plane surfaces, and the brake member is provided with surfaces conforming to said lateral surfaces and slidably bearing thereon to prevent rotation of the expander member and transmit torque from the brake member to the anchor member.

E. ELLIOTT HOOD.

REFERENCES CITED

The following references are of record in the file of this patent:

UNITED STATES PATENTS

| Number | Name | Date |
|---|---|---|
| 1,041,914 | Van Ness et al. | Oct. 22, 1912 |
| 1,412,393 | Enstrom | Apr. 11, 1922 |
| 1,731,728 | Sachs | Oct. 15, 1929 |
| 2,291,486 | Musselman | July 28, 1942 |
| 2,314,845 | Kurzina | Mar. 23, 1943 |
| 2,410,785 | Hood | Nov. 5, 1946 |